June 15, 1965     M. H. MacKENZIE     3,189,844
SEARCH SWEEP OSCILLATOR COMPRISING ONE OR MORE THREE
ELECTRODE TRANSISTORS AND A DOUBLE BASE DIODE
Filed June 7, 1962

*INVENTOR,*
MERLIN H. MACKENZIE

BY Harry M. Saragovitz

ATTORNEY.

United States Patent Office 3,189,844
Patented June 15, 1965

3,189,844
SEARCH SWEEP OSCILLATOR COMPRISING ONE
OR MORE THREE ELECTRODE TRANSISTORS
AND A DOUBLE BASE DIODE
Merlin H. MacKenzie, Mountain View, Calif., assignor to
the United States of America as represented by the
Secretary of the Army
Filed June 7, 1962, Ser. No. 200,898
2 Claims. (Cl. 331—111)

This invention relates to an automatic frequency control circuit, and more particularly to an automatic frequency control circuit for use in such systems as radar where the local-oscillator frequency is swept over a limited range until it locks on a signal.

Many automatic frequency control circuits are known, and among those developed for radar use, several are described in chapter 7 of volume 16 of Radiation Laboratory Series (McGraw-Hill Book Co.). One requirement of these circuits in radar use is that the automatic frequency control (A.F.C.) system should sweep the controlled circuit close to a desired frequency so that an accurate frequency control circuit can then take control of the system. This accurate frequency control usually consists of a discriminator which develops a voltage proportional to frequency. This voltage information is then used to hold the receiver on frequency. The discriminator frequency range is generally limited in bandwidth to limit the "pull-in" frequency range of that portion of the A.F.C. circuit.

The function of the frequency sweep action is to place the signal frequency within the pull-in range of the discriminator, which then generates a signal to stop the sweep. Of the vacuum-tube circuits generally used for producing the sweep signal, the diode-phantastron or diode-transitron control circuit (see sec. 7–13 of vol. 16, Radiation Laboratory Series) most closely resembles the circuit of this invention. However, the diode-transitron type of circuit has certain disadvantages not found in the circuit of this invention. Because vacuum-tubes are used, the power consumption is of the order of fifty times as high, and the supply voltages must necessarily be relatively high, whereas the circuit of this invention may use a low voltage supply in the vicinity of 22.5 volts which is frequently available at this voltage, or higher, in associated equipment, as in aircraft. Furthermore, the vacuum-tube phantastron circuit has a negative going sweep, requires positive pulses for the stop-sweep action, has a relatively long recycle time, and a relatively high output impedance.

It is therefore an object of this invention to provide an improved automatic frequency control circuit.

A further object of this invention is to provide a sawtooth voltage generator for an automatic frequency control circuit.

An additional object of the invention is the provision of an automatic frequency control circuit of reduced size, power consumption, and output impedance, and with a short recycle time.

It is a further object of the invention to provide an automatic frequency control circuit capable of generating very long sweeps for hunting.

Automatic frequency control systems of the type to be described are generally used to supply a sawtooth voltage to sweep the local oscillator of a radar receiver over a limited range, as described in sec. 7.10 and 7.11 of the aforementioned vol. 16 of the Radiation Laboratory Series. The sweep voltage is stopped when a signal is received by the A.F.C. circuit, which then maintains the local oscillator frequency at a constant difference frequency from the incoming signal, the difference frequency being the intermediate frequency of the receiver.

The circuit of this invention utilizes semiconductor devices throughout, and because of the novel arrangement achieves several improvements over the conventional diode-transitron circuit. One very significant result is a considerably reduced recycling time, which improves the overall radar system.

The novel features of the invention as well as the invention itself will best be understood by reference to the following description along with the accompanying drawings in which.

The circuit will now be described with particular reference to FIG. 1. The input 11 is coupled to the base of transistor $Q_1$ through capacitor $C_2$ and resistor $R_1$. Semiconductor diode $CR_2$ and resistor $R_2$ shunt the junction of $C_2$ and $R_1$ to ground, and semiconductor diode $CR_1$ shunts the base-emitter junction of transistor $Q_1$. The collector of $Q_1$ is coupled back to the base through capacitor $C_1$, and directly to the emitter of unijunction transistor or double base diode $Q_2$. This connection is also the output 12 of the circuit, to be coupled to the frequency control circuit of the radar receiver oscillator, if this A.F.C. circuit is to be so used. This could be the repeller electrode of a reflex klystron, for example. The collector of $Q_1$ is connected to a source of supply voltage $V_{bb}$ through resistor $R_3$.

Figure 1:
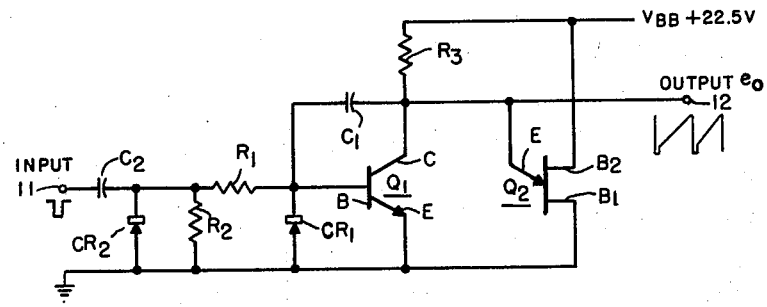
FIG. 1 represents the schematic circuit of an embodiment of the invention.

To explain the operation of FIG. 1, it will first be assumed that there are no pulses supplied to input 11. Normally, the input to this circuit will be pulses from a discriminator circuit driven by an intermediate-frequency amplifier, which in turn is coupled to a radar receiver mixer fed by the local oscillator to be controlled. The discriminator will produce pulses having an instantaneous voltage proportional to the difference between the frequency fed from the intermediate-frequency amplifier and the center frequency to which the discriminator is tuned.

It will be further assumed that, for the moment, capacitor $C_1$ is completely discharged and the base-to-emitter junction of $Q_1$ is conducting. $C_1$ will start to charge to $V_{bb}$ through $R_3$. However, since this positive voltage is fed back to the base of $Q_1$ by $C_1$, the charging of $C_1$ is opposed by the base voltage being amplified by $Q_1$. This action is similar to that of a Miller capacitance amplifier, and the result is a linear positive charging of $C_1$. This charging will continue until the ignition potential of unijunction transistor $Q_2$ is reached. This potential is determined by the product of the intrinsic stand-off ratio and $V_{bb}$.

Figure 2:
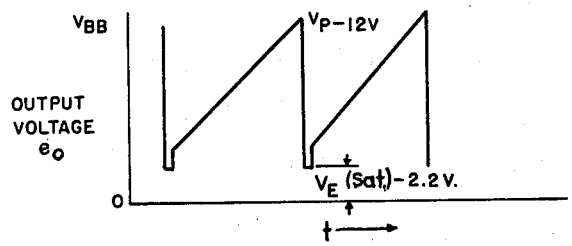
FIG. 2 represents the waveform of the output voltage of FIG. 1.
Figure 3:
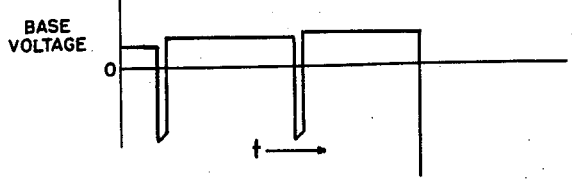
FIG. 3 represents the waveform of the voltage appearing at the base of transistor $Q_1$ of FIG. 1.

When this happens, the emitter of $Q_2$ will conduct heavily, the resistance of the emitter-to-base $B_1$ junction dropping to about 5 ohms, in the case of a 2N492 transistor for $Q_2$. This causes a drop in voltage at the emitter of $Q_2$, and this drop is coupled by $C_1$ back to the base of $Q_1$ as indicated in FIG. 3. Diode $CR_1$ conducts when the base of $Q_1$ reaches about 0.6 volt. $C_1$ will discharge through $CR_1$ and the emitter-to-base $B_1$ junction of $Q_2$ until the voltage of $C_1$ will no longer sustain discharge through these diode junctions. The collector voltage of $Q_1$ drops to $V_e$ (Sat.) of 2–3 volts as shown in FIG. 2, this being the saturation voltage of the $B_1$–E junction of $Q_2$. When $C_1$ is sufficiently discharged $CR_1$ ceases to conduct, effectively increasing its resistance. Both ends of $C_1$ then begin to rise in potential due to the connection of $C_1$ through $R_3$ to $V_{bb}$, and because of the resistance of $CR_1$ in parallel with $R_1$ and $R_2$ in series. The rise of voltage of the end of $C_1$ connected to $CR_1$ will cause the resistance of $CR_1$ to rise further. The resistance of the junction E to $B_1$ of $Q_2$ will also rise as its emitter voltage rises along with the end of $C_1$ connected to $R_3$. This regeneration lasts until the emitter-base junction of $Q_1$ again conducts. Conditions are now as initially assumed above, and the cycle is repeated.

The sweep can be stopped at any point in its rise from $V_e$ to $V_p$ if negative pulses of sufficient amplitude are applied at input 11. As stated above, these pulses are developed by a discriminator circuit to be proportional in amplitude to the frequency error of the oscillator coupled to output 12. The negative pulses at 11 are clamped by $CR_2$ to produce a positive clamp voltage. The time constants of the input circuit are determined by $C_1$ and $R_2$ in parallel with the sum of $R_1$ and the emitter-base resistance of $Q_1$. The positive clamp voltage developed in the input circuit opposes the discharge of $C_1$, converting the sweep circuit to a D.C. amplifier. This state of equilibrium will exist until the pulses at input 11 cease (because the radar signal is lost), and then $C_1$ will continue its charging, to continue the sweep until point $V_p$ of FIG. 2 is reached, at which time $Q_2$ conducts, discharging $C_1$ to $V_e$ and starting a new cycle.

Figure 4:
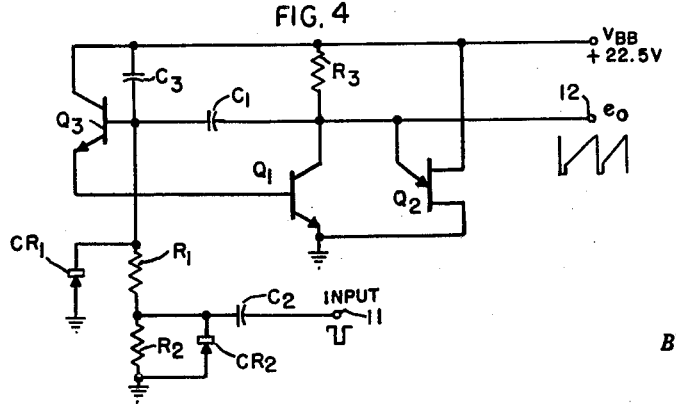
FIG. 4 is the schematic diagram of a modification of the basic circuit for increasing the input impedance and the sweep length.

The circuit of FIG. 4 is basically similar to that of FIG. 1, and corresponding parts are accordingly given the same reference characters. This circuit has been modified, however, to give characteristics which may be more desirable in certain circumstances. $Q_3$ has been added to serve as an emitter-follower to drive $Q_1$. This serves to increase the impedance of the input circuit 11, where the source of locking signals may be sensitive to loading. In order to accommodate this change, $C_1$ is returned to the base of $Q_3$ rather than the base of $Q_1$. $CR_1$ and $R_1$ are also connected to the base of $Q_3$. Because of the effectively increased impedance of the input portion of the circuit due to $Q_3$ interposed between $C_1$ and $Q_1$, the time constant is increased and the sweep time is increased. $C_3$ may be added to increase the time constant still further, where such result is desirable. The operation in other respects is similar to that of FIG. 1.

The circuits of this invention thus have several advantages over the conventional vacuum-tube circuits used for this purpose, not the least of which are the saving in weight and power. Of note is the reduction in output impedance thus reducing the sensitivity of this and related circuits to undesired influences, yet the input impedance of a vacuum-tube circuit may be approached where desired, in the case of FIG. 4. Beyond this, the especially significant achievement is the very short recycle time, as a comparison of FIGS. 2 and 3 with Fig. 7-24 of vol. 16 of the Radiation Laboratory Series will show.

Many modifications of the present invention are possible in the light of the above teachings. It is therefore to be understood that within the scope of the appended claims the invention may be practiced otherwise than as specifically described.

I claim:
1. An automatic frequency control circuit comprising: a transistor having a collector, an emitter and a base; a common point; means to connect said emitter to said common point; a first resistor having two terminals; means to connect one terminal of said first resistor to said base; a second resistor connected between said common point and the second of said two terminals of said first resistor; a first diode connected across said second resistor; a first capacitor connected in series with said first resistor; means to apply an input signal to said first capacitor; a second diode connected between said base and said common point; a second capacitor connected between said base and said collector; a source of supply voltage; means to couple said source of voltage to said collector; a double base diode having a first base, a second base and an emitter; means to connect said first base to said common point; means to connect said emitter of said double base diode to said collector; means to couple said supply voltage to said second base; output circuit means; and means to couple said collector to said output circuit means.

2. An automatic frequency control circuit comprising: a first transistor having a base, a collector and an emitter; a second transistor having a base, a collector, and an emitter; a common point; a first capacitor connected between the base and collector of said first transistor; first and second resistors connected in series between said base of said first transistor and said common point; a first diode connected between said base of said first transistor and said common point; a second diode connected across said second resistor; a second capacitor connected in series with said first resistor; means coupled to said second capacitor for applying an input signal; means to connect the emitter of said first transistor to the base of said second transistor; means to connect the emitter of said second transistor to said common point; output circuit means; means to connect said collector of said second transistor to said output circuit means; a third capacitor connected between the collector of said second transistor and the base of said first transistor; a source of supply voltage; means to couple said source of supply voltage to the collector of said first transistor; means to couple said source of supply voltage to the collector of said second transistor; a double base diode having a first base electrode, a second base electrode and an emitter electrode; means to connect the first base electrode of said double base diode to said common point; means to couple said supply voltage source to the second base of said double base diode; and means to connect the emitter of said double base diode to the collector of said second transistor.

References Cited by the Examiner
UNITED STATES PATENTS

| | | | |
|---|---|---|---|
| 2,879,412 | 3/59 | Hoge et al. | 331—113 X |
| 2,976,432 | 3/61 | Geckle | 331—113 X |
| 3,074,028 | 1/63 | Mammano | 307—88.5 X |

ROY LAKE, *Primary Examiner.*

JOHN KOMINSKI, *Examiner.*